UNITED STATES PATENT OFFICE.

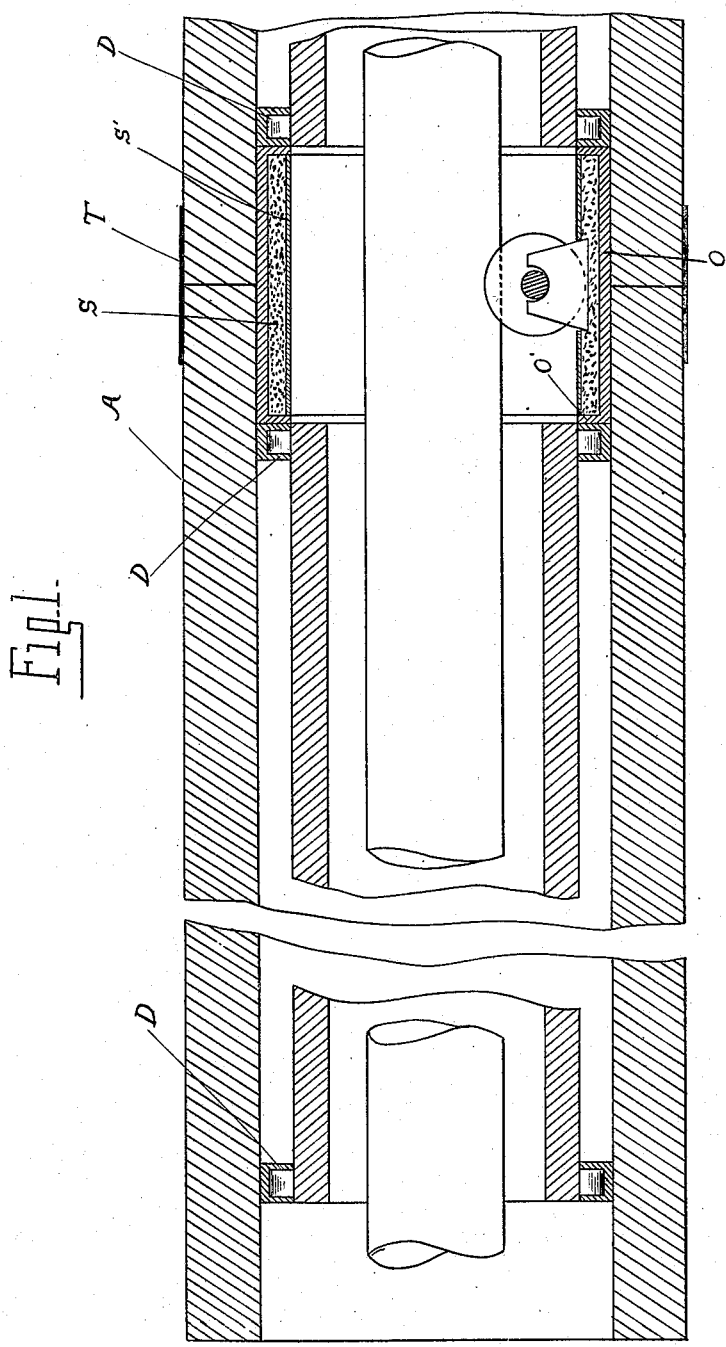

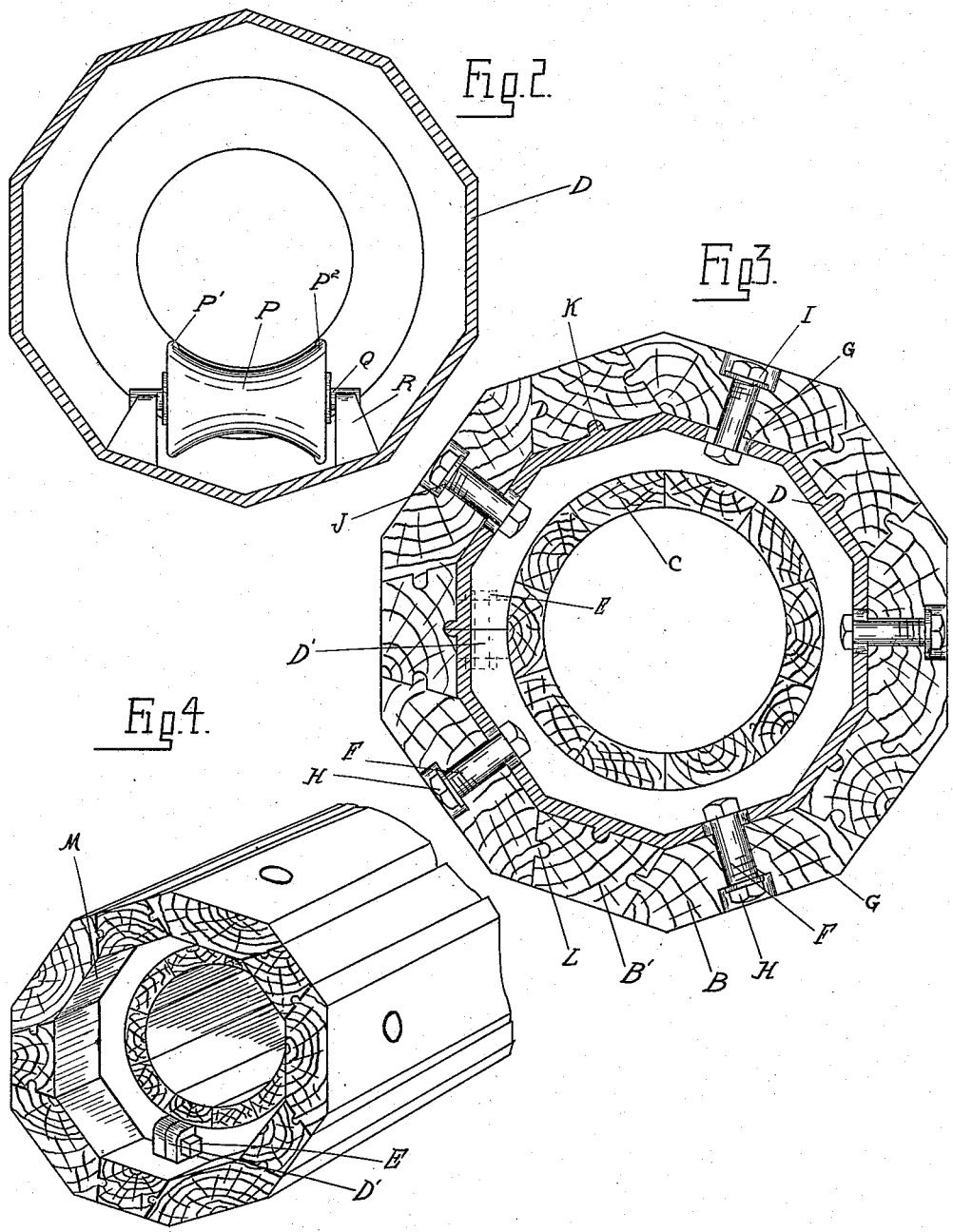

EUGENE L. BARNES, OF DETROIT, MICHIGAN.

CONDUIT.

No. 921,061.     Specification of Letters Patent.     Patented May 11, 1909.

Application filed March 16, 1908. Serial No. 421,546.

*To all whom it may concern:*

Be it known that I, EUGENE L. BARNES, a citizen of the United States of America, residing at Detroit, in the county of Wayne and State of Michigan, have invented certain new and useful Improvements in Conduits, of which the following is a specification, reference being had therein to the accompanying drawings.

The invention relates to a construction of heat insulating conduits more particularly designed for the protection of underground steam pipes, and it is the principal object of the invention to obtain a construction which is high in its heat insulating properties.

It is a further object of the invention to obtain a construction which will afford a firm support for the steam pipe, or other inner conduit, and will also permit the free movement of said pipe to compensate for expansion and contraction.

Still further, it is an object to obtain a construction which is simple to manufacture and is easily placed in position.

With these objects in view, the invention consists in the construction as hereinafter set forth.

In the drawings—Figure 1 is a longitudinal section through a portion of the conduit; Fig. 2 is a cross section in the meeting plane of the two conduit sections illustrating the construction of the coupling member; Fig. 3 is a cross section through one of the sections of the conduit in the plane of the spacing ring; Fig. 4 is a perspective view of a portion of one end of the conduit with the outer casing partly broken away.

In the present state of the art heat insulating conduits for steam pipes have been formed of wooden staves assembled as a jacket about the conduit to be protected and secured together by a winding of wire. The wood is a fairly good heat insulator, and if the staves are held tightly together good results may be obtained. It has been found, however, that the binding wire, which holds the staves together, will soon corrode when the conduit is buried in the ground, and that the expansion and contraction due to the absorption of moisture by the wood when the conduit is cold, and the drying out when it is hot, will often cause the opening up of the jacket. Furthermore, the wood is not as high in its heat insulating properties as when the other substances are in a dead air space. With my improved construction, the effectiveness of the insulation is greatly increased, first, by a construction of stave jacket which will not permit the opening up of the seams, and further by forming a hollow jacket, the space between the inner and outer walls of which is either a dead air space or filled with a substance which is higher in insulating properties than the wood.

As illustrated my improved conduit is formed in sections A which may be successively sleeved upon the conduit to be protected. Each section A is composed of an outer casing formed of staves B B' and an inner casing also formed of staves C. These casings are secured in fixed relation to each other by intermediate spacing rings D which, as illustrated, are of a channel section, the flanges being turned inward. The rings D are preferably split at one point and are provided with lugs D' for engaging with clamping bolts E so that the rings may be securely clamped about the inner staves C to hold them together. The outer staves B B' are preferably formed so as to interlock with each other and the outer faces of the rings D are preferably polygonal to form flat bearings for these staves. The staves B are secured in place by bolts F which engage with apertures G in the rings and pass through the same and through a registering aperture in the stave. The clamping nuts H engage the outer ends of the bolts and are preferably located in a recess I in the stave and bear against a washer J. The staves B' alternate with the staves B and have a dovetail engagement therewith so that they are secure from displacement by the same bolts F. These staves B' are further secured by engagement with outwardly projecting lugs or pins K on the rings D which hold them from longitudinal displacement. There is also preferably provided a tongue and groove engagement L between the staves B B' so that if the wood shrinks to open the seam a tight joint is still maintained by the engagement of the tongue with the groove.

The staves of the inner casing are shorter than those of the outer casing, and are arranged to leave a projecting portion M of the outer casing at each end thereof. Thus the ends of the inner casing in adjacent sections are spaced from each other, and this space is filled by the coupling member O. This coupling performs the further function of a mechanical support for the conduit to be protected and to provide for the movement of said conduit in expansion and contraction a roller bearing is employed. This, as shown, consists of a grooved roll P arranged to form separated bearings P' and P² for the inner conduit, which latter is spaced from the inner casing formed by the staves C and is centered in relation thereto. The roll P is provided with journals Q at opposite ends thereof which engage with bearings in lugs R projecting inward from the coupling member O. This coupling member is preferably formed of cast metal of polygonal form to fit within the projecting portion M of the outer staves. This is also preferably provided with inwardly projecting flanges O' at opposite ends thereof. The space between these flanges, with exception of that occupied by the roll P, is preferably filled with some heat insulating substance S, which is retained in position by an inner sheet metal casing S'.

In laying the conduit, as each section of the inner pipe or steam conduit is placed in position, it is incased by sleeving the sections A of the insulating conduit thereon, and these sections are joined to each other by the coupling members O. The joint between the abutting ends of the outer casings may be protected by a wrapping T of tar paper, felt or other waterproof material, and thus a water-tight case is formed. When in position the inner conduit is supported entirely by resting upon the rolls P so that no stress is placed upon the inner casing, and furthermore this casing is separated from the metal of the inner conduit by a space, either a dead air space or filled with heat insulating material.

It will be observed that the only solid heat conducting material between the outer and inner walls of the sections A is the metal in the flanges of the rings D and the contacting surface of these flanges upon the inner staves is so restricted as to permit very little heat conduction. It will be further observed that the conduit to be protected has no contact with the inner wall of the sections and rests practically upon point bearings and the rolls P, so that loss of heat by conduction through these rolls is very small. Thus the heat insulating efficiency of the conduit as a whole is very high.

What I claim as my invention is:

1. A heat insulating conduit comprising inner and outer casings, each composed of a series of staves, a ring intermediate said casings forming a clamp for the inner staves, and a spacer between said casings, and means for securing the outer staves to said ring.

2. A heat insulating conduit comprising inner and outer casings, the inner casing being composed of a series of staves, an adjustable ring intermediate said casings forming a clamp for the staves of the inner casing and a spacer between said casing, and means for securing the outer casing to said ring.

3. A heat insulating conduit comprising inner and outer casings, each composed of a series of staves, a split clamping ring for binding together the inner staves and for spacing the outer staves therefrom, and bolts anchored in said ring for clamping the outer staves thereto.

4. A heat insulating conduit formed of inner and outer casings sleeved upon the inner conduit to be protected and coupling members for said sections forming the supporting bearings for said inner conduit.

5. A heat insulating conduit formed of sections sleeved upon the inner conduit to be protected, coupling members for said sections, and roller bearings in said coupling members for mechanically supporting the inner conduit.

6. A heat insulating conduit comprising sections, each composed of separated inner and outer casings, the outer casing projecting beyond the ends of the inner casing and a coupling member for adjacent sections fitting within the projecting portions of said outer casing and between the ends of said inner casing.

7. A heat insulating conduit comprising sections, each composed of an inner and outer separated casing, the outer casing projecting beyond the end of the inner casing, and a coupling member for adjacent sections fitting within the outer casing, and having a roller bearing therein for mechanically supporting the conduit to be protected.

8. A heat insulating conduit comprising adjacent sections, and a coupling member for said sections, consisting of an inwardly flanged drum, a supporting roll for the conduit to be protected journaled in said drum and heat insulating material between the flanges of said drum.

9. A heat insulating conduit comprising spaced inner and outer casings, each formed of a series of staves and a spacing ring forming a bearing for the outer staves having an inwardly extending flange forming a bearing of restricted contacting surface for the inner staves, and means for securing said outer staves to said ring.

10. A heat insulating conduit comprising separated inner and outer casings, each composed of a series of staves, a spacing ring of channel section having its flanges extending inwardly and bearing upon said inner staves, and clamping bolts for said outer staves having their heads anchored within the channel of said ring.

11. A heat insulating conduit formed of a series of staves having a tongue and groove engagement with each other at their side edges, and a ring within said conduit to which said staves are clamped.

12. A heat insulating conduit comprising inner and outer separated casings each composed of a series of staves, the staves of the outer casing having a tongue and groove engagement with each other, and a ring intermediate said casings forming a clamp for the inner staves and a spacer between said casings, and means for securing the outer staves to said ring.

In testimony whereof I affix my signature in presence of two witnesses.

EUGENE L. BARNES.

Witnesses:
NELLIE KINSELLA,
JAMES P. BARRY.